United States Patent
Dai et al.

(10) Patent No.: US 9,941,744 B2
(45) Date of Patent: Apr. 10, 2018

(54) NON-CONTACT POWER SUPPLY CIRCUIT

(71) Applicant: Tyco Electronics (Shanghai) Co. Ltd., Shanghai (CN)

(72) Inventors: Feng Dai, Shanghai (CN); Mingjie Fan, Shanghai (CN); Yuming Song, Shanghai (CN); Shaoyong Wang, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 200 days.

(21) Appl. No.: 14/935,827

(22) Filed: Nov. 9, 2015

(65) Prior Publication Data
US 2016/0064143 A1 Mar. 3, 2016

Related U.S. Application Data

(63) Continuation of application No. PCT/IB2014/061131, filed on May 1, 2014.

(30) Foreign Application Priority Data

May 9, 2013 (CN) .......................... 2013 1 01704801

(51) Int. Cl.
| | |
|---|---|
| H02J 7/00 | (2006.01) |
| H01F 38/00 | (2006.01) |
| H02J 50/12 | (2016.01) |
| H02J 50/40 | (2016.01) |
| H02J 50/90 | (2016.01) |
| H02J 5/00 | (2016.01) |
| H02J 7/02 | (2016.01) |
| H01F 38/14 | (2006.01) |

(52) U.S. Cl.
CPC .............. *H02J 50/12* (2016.02); *H01F 38/14* (2013.01); *H02J 5/005* (2013.01); *H02J 7/025* (2013.01); *H02J 50/40* (2016.02); *H02J 50/90* (2016.02)

(58) Field of Classification Search
CPC ............ H01F 38/14; H02J 7/025; H02J 5/005
USPC .......................................... 307/104; 320/108
See application file for complete search history.

(56) References Cited

U.S. PATENT DOCUMENTS

| | | | | |
|---|---|---|---|---|
| 4,996,481 | A * | 2/1991 | Ackerman ........... | G01R 33/341 324/318 |
| 5,568,036 | A * | 10/1996 | Hulsey .................. | B60L 11/182 320/108 |
| 8,110,949 | B2 * | 2/2012 | Kim ........................ | H02J 5/005 307/104 |
| 9,231,411 | B2 * | 1/2016 | Baarman ................. | H02J 5/005 |

(Continued)

FOREIGN PATENT DOCUMENTS

| | | |
|---|---|---|
| WO | 2013018268 A1 | 2/2013 |
| WO | 2013045999 A2 | 4/2013 |

OTHER PUBLICATIONS

PCT International Search Report and Written Opinion, Intl. Application No. PCT/IB2014/061131, dated Aug. 6, 2014, 10 pages.
Abstract of WO2013018268 (A1), dated Feb. 7, 2013, 1 page.

*Primary Examiner* — M'Baye Diao
(74) *Attorney, Agent, or Firm* — Barley Snyder

(57) ABSTRACT

A power supply circuit is disclosed. The power supply circuit includes a primary circuit having at least one transmitting coil and a secondary circuit having at least one receiving coil. The primary circuit and secondary circuit are electromagnetically coupled. The total quantity of the at least one transmitting coil and the at least one receiving coil is greater than two.

23 Claims, 5 Drawing Sheets

(56) References Cited

U.S. PATENT DOCUMENTS

| | | | |
|---|---|---|---|
| 9,607,757 B2* | 3/2017 | Hirobe | H01F 38/14 |
| 2005/0140482 A1 | 6/2005 | Cheng et al. | |
| 2009/0230777 A1* | 9/2009 | Baarman | H01F 38/14 |
| | | | 307/104 |
| 2009/0244866 A1* | 10/2009 | Kawano | H01L 29/0649 |
| | | | 361/765 |
| 2009/0278493 A1* | 11/2009 | Alden | H01R 13/6633 |
| | | | 320/108 |
| 2010/0244583 A1* | 9/2010 | Shimokawa | H01Q 7/00 |
| | | | 307/104 |
| 2010/0314946 A1* | 12/2010 | Budde | H02J 5/005 |
| | | | 307/104 |
| 2011/0121660 A1 | 5/2011 | Azancot et al. | |
| 2012/0007439 A1 | 1/2012 | Kozakai et al. | |
| 2012/0169139 A1* | 7/2012 | Kudo | H02J 17/00 |
| | | | 307/104 |
| 2012/0223595 A1* | 9/2012 | Oodachi | H02J 17/00 |
| | | | 307/104 |
| 2013/0043734 A1* | 2/2013 | Stone | H04B 5/0037 |
| | | | 307/104 |
| 2013/0234533 A1* | 9/2013 | Kato | H02J 17/00 |
| | | | 307/104 |
| 2013/0241302 A1* | 9/2013 | Miyamoto | G01N 27/00 |
| | | | 307/104 |
| 2013/0300204 A1* | 11/2013 | Partovi | H01F 38/14 |
| | | | 307/104 |
| 2014/0021795 A1* | 1/2014 | Robertson | H01F 38/18 |
| | | | 307/104 |
| 2014/0225439 A1* | 8/2014 | Mao | H02M 3/3376 |
| | | | 307/31 |
| 2014/0361634 A1* | 12/2014 | Scholz | H04B 5/0031 |
| | | | 307/104 |
| 2015/0326033 A1* | 11/2015 | Ichikawa | H02J 5/005 |
| | | | 307/104 |

* cited by examiner

NON-CONTACT POWER SUPPLY CIRCUIT

CROSS-REFERENCE TO RELATED APPLICATIONS

This application is a continuation of PCT International Application No. PCT/IB2014/061131 filed May 1, 2014, which claims priority under 35 U.S.C. § 119 to Chinese Patent Application No. 2013101704801 filed May 9, 2013.

FIELD OF THE INVENTION

The invention relates to a power supply circuit, and more particularly to a non-contact power supply circuit.

BACKGROUND

Many electrical and electronic devices are composed of a fixed body and a moving part. The moving part may be, for example, a rotational part such as washing machine door or a refrigerator door etc., or may be a translational moving part, such as a refrigerator drawer. End users of such equipment increasingly require ease of use and improved aesthetics, consequently, many of the control and display functions are integrated on the moving parts.

Physical wire connections between the fixed body and the moving part, used to transfer electrical energy, are subject to wear and decreased life due to the repeated motion of the moving part. For these reasons, non-contact power transmission is used.

As is known in the art, non-contact transmission may be achieved by electromagnetic coupling between a transmitting coil and a receiving coil. An electric field or magnetic field is created between the transmitting coil and the receiving coil to transmit the electrical energy. In these applications, the strength and consistency of the field is critically important.

It is conventional to use a single transmitter coil and a single receiver coil. The coils, however, are limited by the size of the installation location and environment. Furthermore, the coupling efficiency of one to one coils will change as the position of the coil changes, which necessarily restricts the efficiency and power transmission of the system.

SUMMARY

An object of the invention is to provide a non-contact power supply circuit that can transmit power efficiently in a wide variety of applications. The disclosed power supply circuit includes a primary circuit having at least one transmitting coil and a secondary circuit having at least one receiving coil. The primary circuit and secondary circuit are electromagnetically coupled. The total quantity of the at least one transmitting coil and the at least one receiving coil is greater than two.

BRIEF DESCRIPTION OF THE DRAWINGS

The invention will now be described by way of example with reference to the accompanying figures, of which.

DETAILED DESCRIPTION OF THE EMBODIMENT(S)

The invention is explained in greater detail below with reference to embodiments of a non-contact power supply circuit. This invention may, however, be embodied in many different forms and should not be construed as limited to the embodiments set forth herein; rather, these embodiments are provided so that this disclosure will be thorough and complete and still fully convey the scope of the invention to those skilled in the art.

Figure 1:
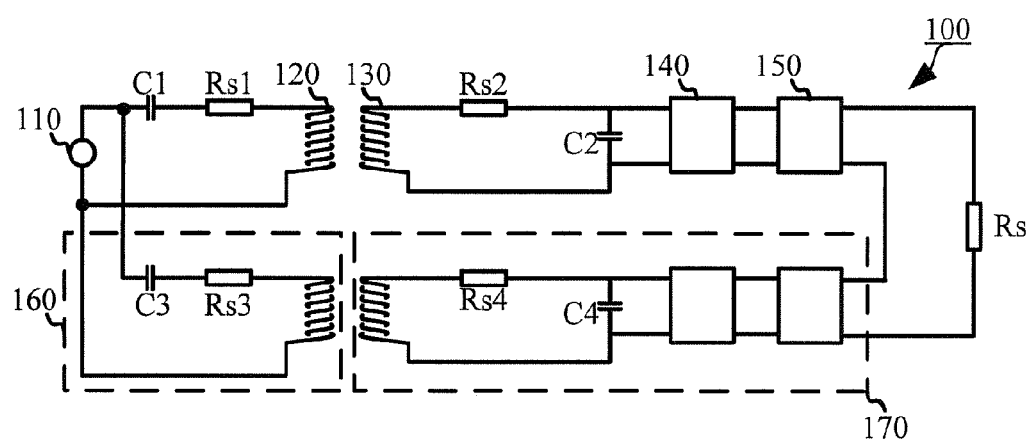
FIG. 1 is a circuit diagram of the non-contact power supply circuit according to the invention.

FIG. 1 illustrates a non-contact power supply circuit 100 according to the invention. The non-contact power supply circuit 100 includes a primary circuit and a secondary circuit. The primary circuit includes a power source 110, at least one transmitting coil 120, and transmitting circuit 160. The secondary circuit includes at least one receiving coil 130, rectifier 140, transformer 150, receiving circuit 170, and load Rs. The total quantity of the at least one transmitting coil 120 and the at least one receiving coil 130 is greater than two. The normal direction of the at least one transmitting coil 120 and the normal direction of the at least one receiving coil 130 are the same or have a first angle.

The primary circuit of the non-contact power supply circuit 100 transfers energy to the secondary circuit via electromagnetic coupling. As can be seen from FIG. 1, the whole circuit is vertically symmetrical. The power source 110 supplies power to the two circuits connected in parallel with each other, wherein one of the two circuits is transmitting circuit 160, and the other is the circuit composed of C1, Rs1 and the coil 120. The primary circuit transmits power to the secondary coil 130 or the receiving coil of the additional receiving circuit 170 of the secondary circuit via electromagnetic coupling. Electrical energy generated in the secondary circuit is rectified by the rectifier 140 and thereby converted into a DC voltage having a certain voltage set by the transformer 150, so as to supply power to the load Rs. In one embodiment of the invention, the load Rs is a rechargeable battery. In another embodiment, the load Rs is an appliance.

The embodiment shown in FIG. 1 is only illustrative and not limiting; as long as the principle shown in FIG. 1 is applied and the total quantity of the at least one transmitting coil 120 and the at least one receiving coil 130 is greater than two, such a circuit would fall within the scope claimed in the invention. A combination of one transmitting coil 120 and at least two receiving coils 130, a combination of at least two transmitting coils 120 and one receiving coil 130, and a combination of at least two transmitting coils 120 and at least two receiving coils 130 are intended to fall within the scope of the invention.

Furthermore, one skilled in the art would appreciate that the two transmitting circuits of the primary circuit can also be connected in series, so that the two transmitting circuits are incorporated into a transmitting circuit having two transmitting coils. Accordingly, the secondary circuit of the two receiving circuits can be connected in parallel, so that the two circuits are used as a backup circuit to each other. In another embodiment of the present invention, the quantity of at least one receiving coil is greater than or equal to the number of two and the receiving coils are connected in series. Optionally, the quantity of the at least one transmitting coil is larger than or equal to two and the transmitting coils are connected in parallel. Alternatively or additionally, the quantity of the at least one transmitting coil is larger than or equal to two and the transmitting coils are connected in series.

a. FIGS. 2-5 show variations in the assembly orientation and positioning of the transmitting coils 120 with respect to the receiving coils 130.

Figure 2A:
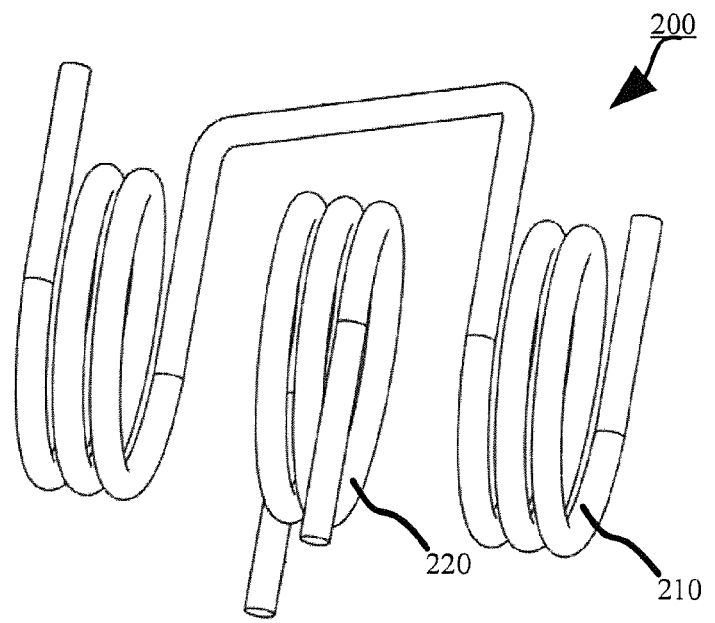
FIG. 2a is a perspective view of a coil arrangement of the non-contact power supply circuit according to the invention.
Figure 2B:
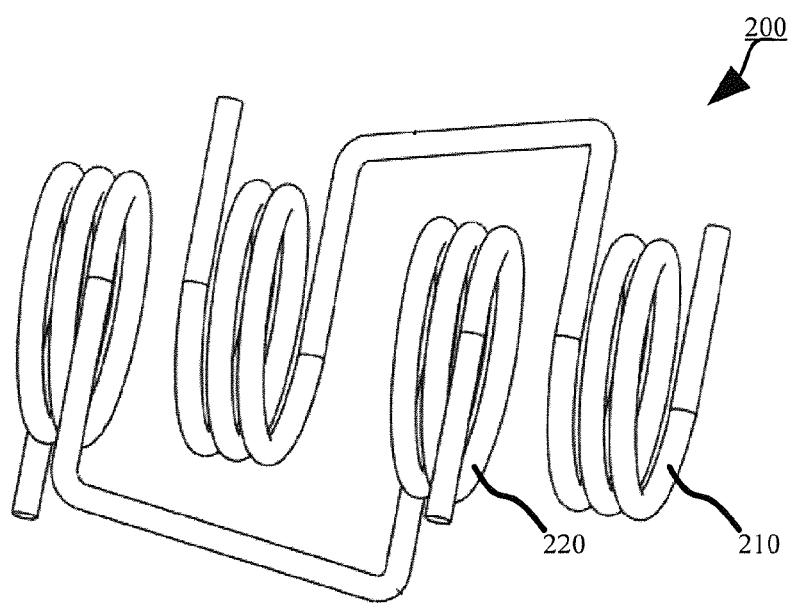
FIG. 2b is a perspective view of a coil arrangement of the non-contact power supply circuit according to the invention.

FIGS. 2a and 2b show two embodiments 200 of a non-contact power supply circuit according to the invention. FIG. 2a shows a first coil 210, which can be either transmitting coil 120 or receiving coil 130, placed on both sides of the second coil 220, which is the other of the transmitting coil 120 and receiving coil 130. As shown in FIG. 2b, the quantity of the second coil 220 can also be two or more like the quantity of the first coil 210. The first coil 210 and the second coil 220 are disposed spaced apart from each other. In the shown embodiment, the normal direction of the first coil 210 and the normal direction of the second coil 220 are the same.

Figure 3A:
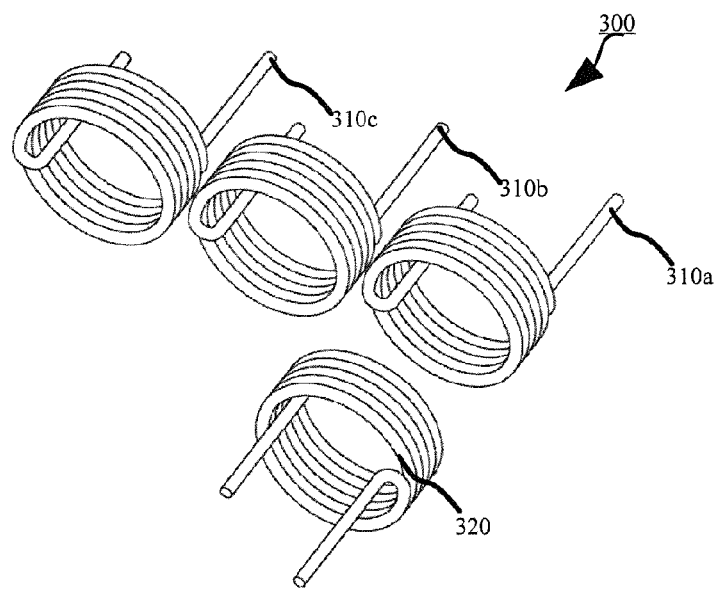
FIG. 3a is a perspective view of a coil arrangement of the non-contact power supply circuit according to the invention.
Figure 3B:
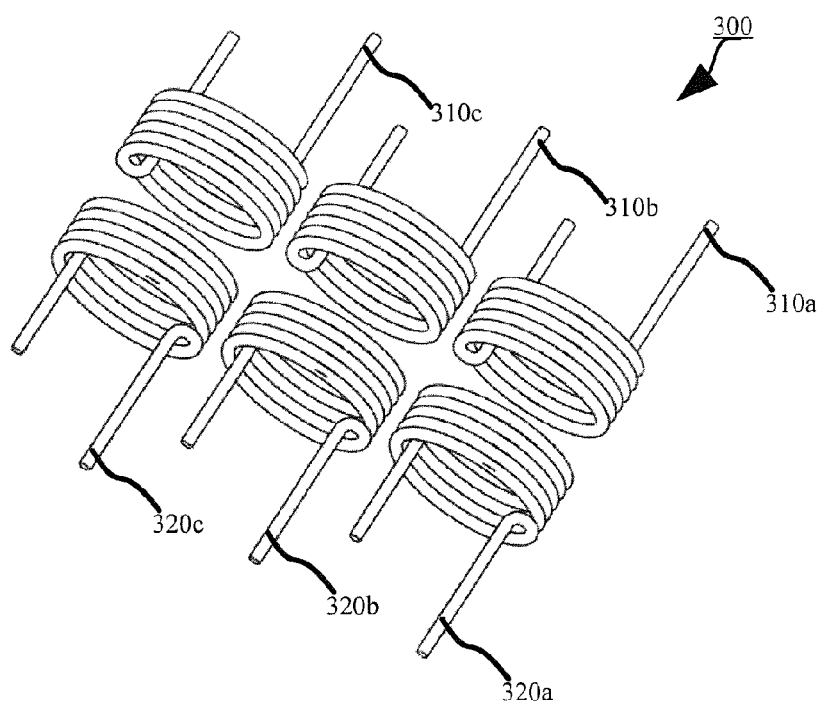
FIG. 3b is a perspective view of a coil arrangement of the non-contact power supply circuit according to the invention.

Alternatively, FIGS. 3a and 3b show the coil placement 300 of a non-contact power supply circuit including first coils 310a, 310b, 310c, which can be either transmitting coils 120 or receiving coils 130, and the second coil 320, which is the other of the transmitting coil 120 and receiving coil 130. In the embodiment of FIG. 3b, the second coil 320 can also be a plurality of coils 320a, 320b, and 320c. The first coils 310a, 310b, and 310c, are placed opposite to the second coils 320 or 320a, 320b, and 320c.

Figure 4A:
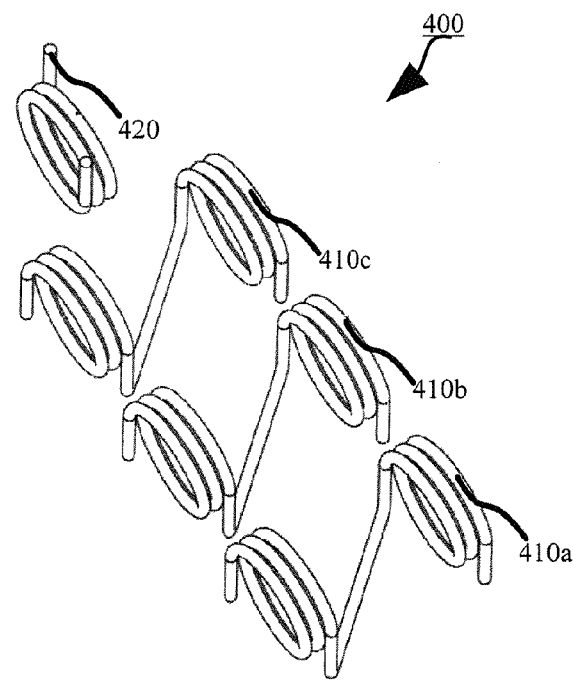
FIG. 4a is a perspective view of a coil arrangement of the non-contact power supply circuit according to the invention.
Figure 4B:
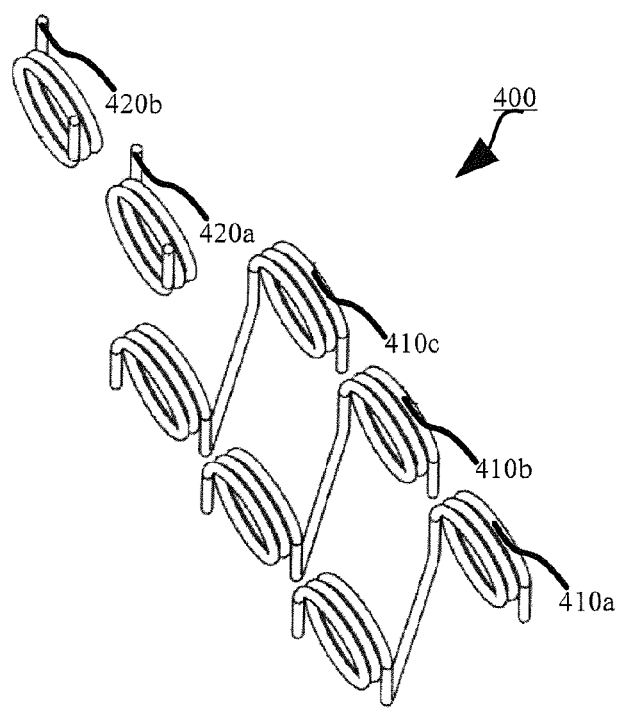
FIG. 4b is a perspective view of a coil arrangement of the non-contact power supply circuit according to the invention.

FIGS. 4a and 4b illustrate two diagrams of two embodiments 400 of the non-contact power supply circuit according to the invention. In these two embodiments the coils may be translationally movable with respect to each other. The first coils 410a, 410b and 410c, which can be either transmitting coils 120 or receiving coils 130, are positioned to form a passageway through which the second coil 420, which is the other of the transmitting coil 120 and receiving coil 130, may pass. As shown in FIG. 4b, the second coil 420 may be a plurality of coils 420a, 420b.

Figure 5A:
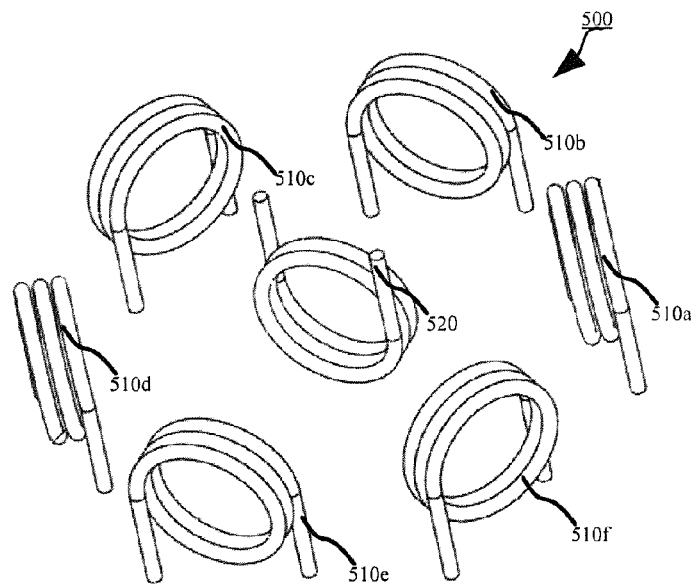
FIG. 5a is a perspective view of a coil arrangement of the non-contact power supply circuit according to the invention.
Figure 5B:
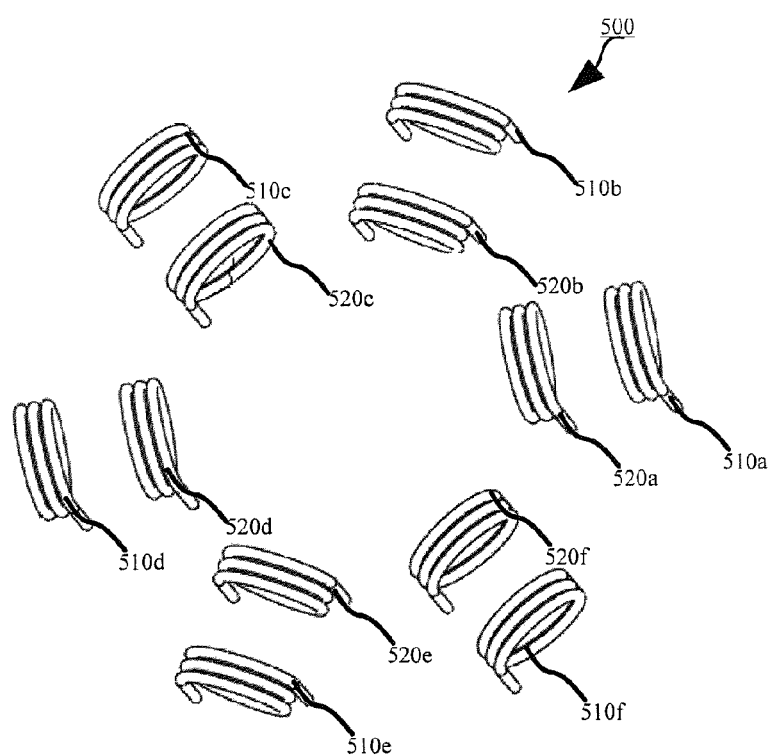
FIG. 5b is a perspective view of a coil arrangement of the non-contact power supply circuit according to the invention.

FIG. 5a and FIG. 5b illustrate two diagrams of two embodiments 500 of the non-contact power supply circuit according to the invention. In these two embodiments the coils may be rotationally movable with respect to each other. As shown in FIGS. 5a and 5b, the first coils 510 include coils 510a, 510b, 510c, 510d, 510e and 510f and are positioned to form a ring shape. The first coils 510 can be either transmitting coils 120 or receiving coils 130. The first coils 510 surround the second coil 520, which is the other of the transmitting coil 120 and receiving coil 130. As shown in FIG. 5b, the second coil 520 may be a plurality of coils 520a, 520b, 520c, 520d, 520e, and 520f also positioned to form a ring shape. The first coils 510 rotate around the second coil 520; the normal direction of the first coil 510 is parallel to the normal direction of the second coil 520, and the first coil 510 is rotationally movable around the normal direction of the second coil 520.

Advantageously, in the embodiments described above, more than one receiving coil or more than one transmitting coil may be arranged, and thus the receiving efficiency or the transmitting efficiency will be improved. Moreover, since more than one receiving coil or more than one transmitting coil may be arranged, the size of the individual coils can be made smaller than in the case of using only one transmitting or receiving coil, and thus the limitation of the size of installation location is reduced. The above embodiments also improve non-contact power transmission efficiency by maintaining a stable power supply during translational and rotational movement of the primary circuit with respect to the secondary circuit, further broadening the range of useful applications.

What is claimed is:

1. A power supply circuit, comprising:
a primary circuit having at least one transmitting coil; and
a secondary circuit having at least one receiving coil, the at least one receiving coil spaced apart from the at least one transmitting coil; wherein
the primary circuit and secondary circuit are electromagnetically coupled, and the total quantity of the at least one transmitting coil and the at least one receiving coil is greater than two, a plurality of transmitting coils are disposed on both sides of the at least one receiving coil or a plurality of receiving coils are disposed on both sides of the at least one transmitting coil.

2. The power supply circuit according to claim 1, wherein the normal direction of the at least one transmitting coil and the normal direction of the at least one receiving coil are the same.

3. The power supply circuit according to claim 1, wherein the normal direction of the at least one transmitting coil and the normal direction of the at least one receiving coil have a first angle.

4. The power supply circuit according to claim 1, wherein a plurality of receiving coils are disposed opposite a plurality of transmitting coils.

5. The power supply circuit according to claim 1, wherein a plurality of transmitting coils are positioned to form a passageway.

6. The power supply circuit according to claim 5, wherein the at least one receiving coil is disposed within the passageway and translationally movable within the passageway.

7. The power supply circuit according to claim 1, wherein a plurality of transmitting coils are positioned to form a ring shape.

8. The power supply circuit according to claim 7, wherein the at least one receiving coil is disposed within the transmitting coil ring and rotationally moveable with respect to the transmitting coil ring.

9. The power supply circuit according to claim 8, wherein a plurality of receiving coils are positioned to form a ring shape.

10. The power supply circuit according to claim 8, wherein the normal direction of the at least one receiving coil is parallel to the normal direction of the transmitting coils, and the at least one receiving coil is rotationally movable around the normal direction of the at least one transmitting coil or the transmitting coils are rotationally movable around the normal direction of the at least one receiving coil.

11. The power supply circuit according to claim 1, wherein the secondary circuit further includes a rectifier electrically connected to the at least one receiving coil.

12. The power supply circuit according to claim 11, wherein the secondary circuit further includes a transformer electrically connected to the rectifier.

13. The power supply circuit according to claim 12, wherein the secondary circuit further includes a load electrically connected to the transformer.

14. The power supply circuit according to claim 13, wherein the load is a rechargeable battery.

15. The power supply circuit according to claim 1, wherein the quantity of the at least one receiving coil is greater than or equal to two and the receiving coils are connected in series.

16. The power supply circuit according to claim 1, wherein the quantity of the at least one transmitting coil is larger than or equal to two and the transmitting coils are connected in parallel.

17. The power supply circuit according to claim 1, wherein the quantity of the at least one transmitting coil is larger than or equal to two and the transmitting coils are connected in series.

18. A power supply circuit, comprising:
a primary circuit having at least one transmitting coil; and
a secondary circuit having at least one receiving coil, the at least one receiving coil spaced apart from the at least one transmitting coil and a normal direction of the at least one transmitting coil and a normal direction of the at least one receiving coil having a first angle; wherein
the primary circuit and secondary circuit are electromagnetically coupled, and the total quantity of the at least one transmitting coil and the at least one receiving coil is greater than two.

19. A power supply circuit, comprising:
a primary circuit having at least one transmitting coil; and
a secondary circuit having at least one receiving coil, the at least one receiving coil spaced apart from the at least one transmitting coil; wherein
the primary circuit and secondary circuit are electromagnetically coupled, and the total quantity of the at least one transmitting coil and the at least one receiving coil is greater than two, a plurality of transmitting coils are positioned to form a passageway and the at least one receiving coil is disposed within the passageway and translationally movable within the passageway.

20. A power supply circuit, comprising:
a primary circuit having at least one transmitting coil; and
a secondary circuit having at least one receiving coil, the at least one receiving coil spaced apart from the at least one transmitting coil; wherein
the primary circuit and secondary circuit are electromagnetically coupled, and the total quantity of the at least one transmitting coil and the at least one receiving coil is greater than two, a plurality of transmitting coils are positioned to form a ring shape.

21. The power supply circuit according to claim 20, wherein the at least one receiving coil is disposed within the transmitting coil ring and rotationally moveable with respect to the transmitting coil ring.

22. The power supply circuit according to claim 21, wherein a plurality of receiving coils are positioned to form a ring shape.

23. The power supply circuit according to claim 21, wherein the normal direction of the at least one receiving coil is parallel to the normal direction of the transmitting coils, and the at least one receiving coil is rotationally movable around the normal direction of the at least one transmitting coil or the transmitting coils are rotationally movable around the normal direction of the at least one receiving coil.

* * * * *